United States Patent [19]

Kitamura et al.

[11] Patent Number: 5,495,652
[45] Date of Patent: Mar. 5, 1996

[54] INSERTION MECHANISM, A CAULKING MECHANISM AND AN INSERTION/CAULKING DEVICE

[75] Inventors: Masatoshi Kitamura; Eitarou Sakurai, both of Daito, Japan

[73] Assignee: Nawaseikiseisakusho Corporation, Osaka, Japan

[21] Appl. No.: 268,513

[22] Filed: Jun. 30, 1994

[30] Foreign Application Priority Data

Jul. 5, 1993 [JP] Japan ................. 5-165486

[51] Int. Cl.⁶ .................. B23P 19/00; B23Q 7/10
[52] U.S. Cl. .................. 29/243.5; 29/252
[58] Field of Search ................. 29/525.1, 426.5,
29/243.5, 243.56, 252, 809, 464, 281.5,
818, 238, 251, 451, 525; 285/363, 368,
405, 412, 424

[56] References Cited

U.S. PATENT DOCUMENTS 4,398,334  8/1983  Kovalevich ............. 29/243.5
5,283,944  2/1994  Goodhue ............. 29/243.5
5,375,312  12/1994  Sakurai et al. ............. 29/243.5

Primary Examiner—Robert C. Watson
Attorney, Agent, or Firm—Evenson, McKeown, Edwards & Lenahan

[57] ABSTRACT

For serving as an insertion mechanism M1, a pressure member 12 is supported in a vertically swingable manner through swing arms 51 to tip ends of vertically swingable push arms 13, and the pressure member 12 is adapted to push a corner piece in an inclining nose-up position. For serving as a caulking mechanism M2, an opening angle of a tip end caulking claw 40 of a caulking plate 15 is made larger than the right angle. For serving as an insertion/caulking device, a drive force transmitting mechanism M3 is installed, which actuates the insertion mechanism M1 interlocking with a former period stroke of one hydraulic cylinder 26 and actuates the caulking mechanism M2 interlocking with its latter period stroke. Thereby, an assembly accuracy and a work efficiency can be improved when assembling the corner piece. Further, the insertion mechanism and the caulking mechanism can be operated in sequence according to a work stroke by one stretching operation of one drive actuator.

3 Claims, 8 Drawing Sheets

INSERTION MECHANISM, A CAULKING MECHANISM AND AN INSERTION/CAULKING DEVICE

BACKGROUND OF THE INVENTION

This invention relates to an insertion mechanism, a caulking mechanism and an insertion/caulking device used for inserting and fastening an L-shaped corner piece to a concave outward flange in order to reinforce a corner portion of an open edge of duct when manufacturing an air-conditioning duct having a rectangular cross section.

FIG. 8 shows an oblique view of a partly manufactured air-conditioning duct. A duct body 1 is formed having a rectangular cross-section using a surface-treated iron plate, in which a side plate 1a has at its open edge an integral outward flange 3 at right angles to the side plate 1a, and the flange 3 has at its outside end an integral bent portion 6 at right angles to the flange 3 so as to be formed a channel. A convex groove 7 having a circular-arc cross section, which extends straight in parallel with and at the same height as a tip edge of the bent portion 6 and projects to the outside as illustrated by FIG. 8, is formed on the side plate 1a.

In the duct having the above-mentioned structure, an L-shaped corner piece 5 is pushed to a corner portion 4 and an upper end of the bent portion 6 is crimped so as to fasten the corner piece 5 as shown in FIG. 9, in order to fill the corner portion 4 between adjoining flanges and reinforce coupling of the flanges 3 each other.

A vertically movable L-shaped pressure member, for example, is provided in a conventional insertion mechanism for inserting the corner piece 5 so that the corner piece 5 is pushed in the corner portion 4 by making the pressure member move down.

In a conventional caulking mechanism, swingable caulking claws are arranged in V-shaped positions and upper end portions of both-sides bent portions 6 of the corner piece 4 are trued up and caulked by swinging the caulking claws.

The insertion mechanism and the caulking mechanism are installed independently of each other. The insertion mechanism is removed from the corner piece 5 after pushing the L-shaped corner piece 5 in the concave flange 3 by the insertion mechanism, and the bent portion 6 is then caulked by the caulking mechanism independently.

However, mutual vertical deviations between the side plates 1a, dispersions of bending angles and/or dispersions of angles between the flange 3 and the side plate 1a due to twisting of the flange 3 etc. sometimes occur in the duct body 1 which is assembled into the rectangular shape by the side plates 1a. In case when inserting or caulking the corner piece 5 to such the duct body 1, faulty insertion or faulty caulking would occur in the structure of merely pushing the corner piece from above position or merely caulking it from side position as in case of conventional one. Further, efficiency is poor when inserting and caulking works are carried out by separate mechanisms independently.

An object of this invention is to improve assembly accuracy and a work efficiency in the work for assembling the corner piece.

Another object of this invention is to enable operation of the insertion mechanism and the caulking mechanism in sequence according to a work stroke by a single stretching action of one drive actuator, so as to further improve the work efficiency.

SUMMARY OF THE INVENTION

The invention includes a corner piece insertion mechanism for inserting an L-shaped corner piece into corner portions of concave outward flanges formed on open edges of a duct having a rectangular cross section. A pair of push arms parallel to each other are installed in a vertically swingable manner. The swing arms are supported to duct-side tip ends of push arm ends through support pins in a vertically swingable manner, a pressure member for contacting with and pushing down the corner piece is supported to further tip ends of both swing arms through swing pins in a vertically swingable manner, the push arms are provided with stoppers for restricting the swing arms from rising at those tip end sides beyond a specified angle relative to the push arms, and the other ends of the push arms are connected to and interlocked with a drive actuator through a drive force transmission mechanism for driving the push arms in a vertical direction.

In a another embodiment a caulking mechanism is provided for caulking upper ends of bent portions of flanges in order to fasten an L-shaped corner piece inserted into corner portions of concave outward flanges formed on open edges of a duct having a rectangular cross section. A caulking plate moving forward and backward in horizontal direction relative to the duct is installed, a caulking claw which opens toward the duct into an L-shaped form and can contact with upper ends of bent portions of flanges of the duct is integrally installed at a tip end of the caulking plate, an opening angle of the caulking claw is made larger than the right angle, and the other end of the caulking plate is connected to and interlocked with a drive actuator through a drive force transmission mechanism.

In a further embodiment, a corner piece insertion/caulking mechanism is provided for inserting an L-shaped corner piece into corner portions of concave outward flanges formed on open edges of a duct having a rectangular cross section and for caulking upper ends of bent portions of the flanges. Push arms supported in a vertically swingable manner and having a pressure member at those tip ends are provided for serving as an insertion mechanism, a caulking plate having an L-shaped caulking claw at its tip end and movable forward and backward relative to the duct is provided for serving as a caulking mechanism, an actuator operating in stretching and retracting ways is provided for serving as a drive actuator, and a drive force transmitting mechanism is provided, which is equipped with a cam mechanism for swinging the push arms of the above insertion mechanism interlocking with a former period stroke of the drive actuator and a mechanism for advancing the caulking plate interlocking with a latter period stroke of the drive actuator.

In case where the corner piece is inserted into the corner portion of the concave flange, the upper ends of bent portions of the flanges and the corner piece placed on the convex streaks of the body are pushed down with the pressure member by swinging the push arms.

In this instance, the pressure member is supported to the swing arms in the vertically swingable manner at the further tip ends through the swing arms relative to the tip ends of the push arms. Therefore, at the beginning of pushing the corner piece by the pressure member, the pressure member is pushed down with its tip end lifted up i.e. an inclining position with rear side lowered. Accordingly, the corner piece is clamped down gradually from its corner side to both sides so as to be inserted in the corner portion of the concave flange.

When caulking it in the next stage, the caulking plate is advanced to the duct side in horizontal direction so as to caulk the upper ends of bent portions of flanges of the duct by the L-shaped tip end caulking claw.

In this instance, the opening angle of the caulking claw is made larger than the opening angle of corner of the duct i.e. larger than the right angle, so that the caulking work is advanced gradually from a portion corresponding to the corner to the both sides.

By using only one insertion/caulking device and by means of only one stroke operation of one drive actuator, the inserting work of corner piece is carried out by actuating the insertion mechanism through the cam mechanism in a former period, and the caulking/fastening operation is carried out by actuating the caulking mechanism in a latter period.

As described above, the assembly accuracy of the corner piece can be improved and the work efficiency can be made better according to the present invention.

In other words;

(1) According to the invention, the corner piece 5 can be pushed in the concave flange 3 at the corner portion 4 of the duct body 1 in the inclining position with the corner side lowered, so that the corner piece 5 can be pushed in the concave flange 3 smoothly and the work efficiency can be improved even when the corner piece 5 is placed on the corner portion 4 of the duct body 1 in a position somewhat deviated from correct position.

(2) Even when there are a mutual deviation between side plates of the duct 1, a change in bending angle and/or a deviation of the flange 3; the corner portion of the corner piece 5 will be first pushed in the concave flange 3 against an outer peripheral edge portion of the duct body 1 and will be pushed down onto a bottom surface of the flange 3 gradually from the corner side. Therefore, the mutual deviation between the side plates etc. are corrected so that the assembly accuracy can be improved.

(3) According to the invention, when caulking the bent portions 6 of the flanges 3 of duct, these can be caulked from the portions corresponding to the bent corner sides gradually to the both sides by only letting the caulking plate 15 slide in the horizontal direction. Therefore, the caulking work can be carried out smoothly and securely.

(4) According to the invention, the insertion stroke and the caulking stroke of corner piece can be carried out continuously by only one device and by means of the operation of one drive actuator. Therefore, the work efficiency can be improved and the work accuracy can be made better.

DETAILED DESCRIPTION OF THE PREFERRED EMBODIMENTS

Figure 1:
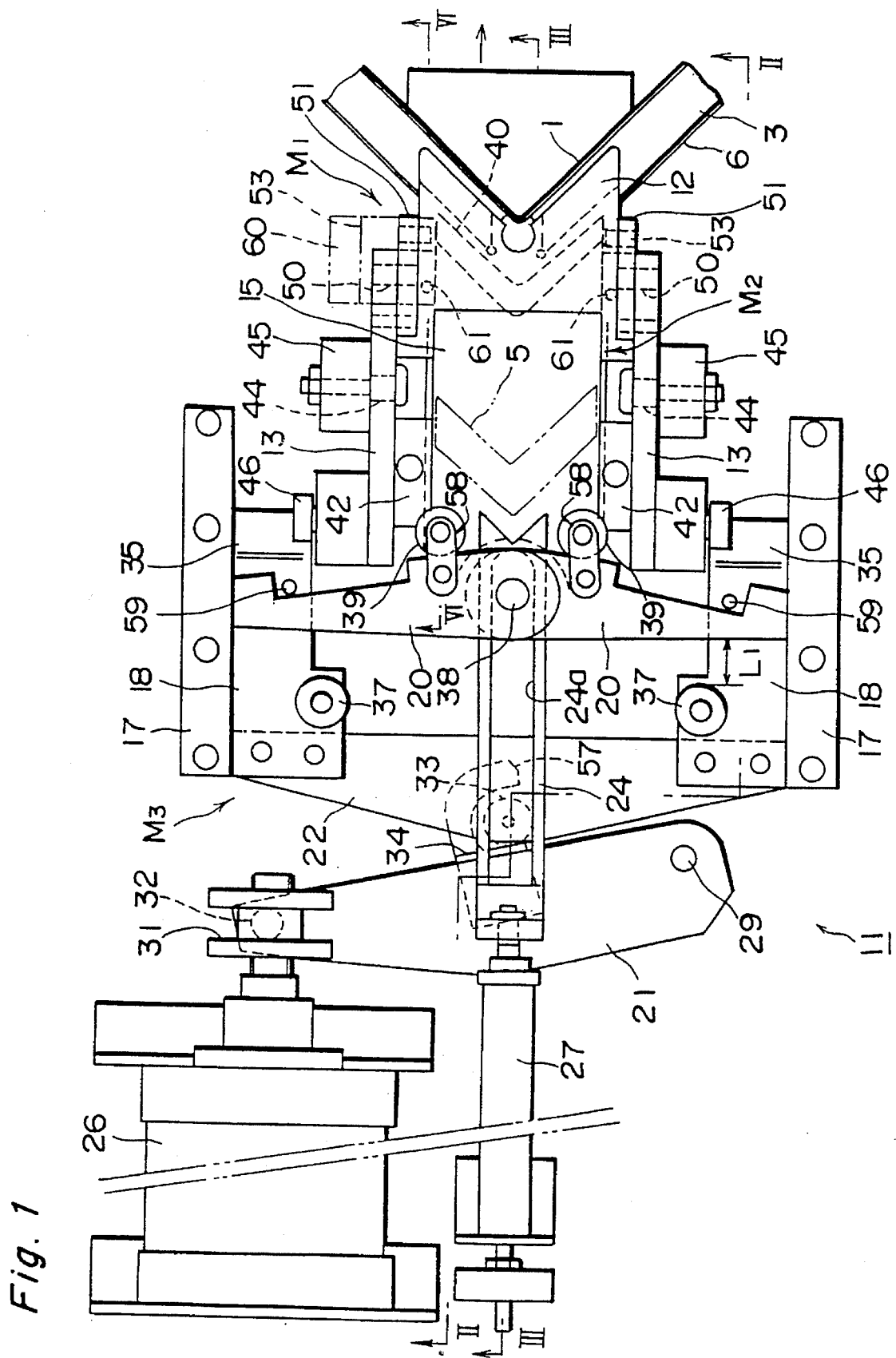
FIG. 1 is a general plan view of the insertion/caulking device to which this invention is applied.

FIG. 1 shows the plan view of the insertion/caulking device for a corner piece to which this invention is applied. The side to which a body duct is fed is temporarily assumed as the front. On a plane base 11; an insertion mechanism M1 comprising a pressure member 12, a pair of left and right swing arms 51 and a pair of left and right push arms 13 etc., and a caulking mechanism M2 comprising a caulking plate 15 etc., are installed on its front part; a drive force transmitting mechanism M3 comprising a pair of left and right guides 17 extending in longitudinal direction, a pair of left and right cam members 18, a pair of left and right swing levers 20, a drive lever 21 and a transmitting plate 22 etc. and a pusher 24 for feeding the corner piece are installed on its intermediate part, and a hydraulic cylinder 26 serving as an actuator for the insertion and caulking works and a hydraulic cylinder 27 for driving the pusher are installed on its rear part.

Although not shown in the figure, there is installed a workpiece stocker at a rear upper part of the caulking plate 15 so as to feed the corner piece 5 onto the caulking plate 15 one by one as shown by an imaginary line.

The drive force transmitting mechanism M3 will be explained hereunder. The drive lever 21 extends approximately in a lateral direction, its one end is supported rotatably to the base 11 through a fulcrum shaft 29, and a perpendicular engagement pin 32 provided at its other end engages with an annular engagememt portion 31 at a rod tip end of the hydraulic cylinder 26. A contact member 34 is secured to an intermediate part of the drive lever 21 and in contact with a central roller 33 of the transmitting plate 22. The lever ratio of the drive lever 21 is set approximately to 2 to 1, so that the pushing force of the hydraulic cylinder 26 is multiplied and transmitted to the transmitting plate 22.

The cam members 18 are secured to left and right ends of the transmitting plate 22, and the respective cam members 18 are placed on the base 11 in a freely sliding manner and so guided as to slide only in a longitudinal direction by the respective guides 17. A cam surface 35 descending toward the front side is formed on an upper surface of the front end of each cam member 18, and a push roller protruding upward is installed at its rear part.

The swing levers 20 are rotatably supported on a perpendicular support pin 38 installed at a central part of the lateral width and extends to left and right respectively; the rear edges of swing levers 20 force the push rollers 37 of the respective cam members 18 with a space L1 for insertion an stroke left between them.

A pair of left and right rollers 39 are perpendicularly installed at rear portions of the caulking plate 15, and in contact with the front faces near to the central parts of the swing levers 20 respectively. In other words, even the swing levers 20 are adapted to multiply the transmitting force by providing a lever ratio of 2 to 1 or larger.

As a return mechanism; a hook 57 engaging with a central roller 33 of the transmitting plate 22 is provided on the drive lever 21, the swing levers 20 are pivotally connected to the caulking plates 15 by links 58, and return pins 59 contacting with front faces of the swing levers 20 before-operating condition are fitted to the cam members 18.

The pusher 24 extends lengthwise in the longitudinal direction and has a slit 24a at a central part of its lateral width, the slit 24a engages with the support pin 38 so as to be restricted to move only in the longitudinal direction. A front end of the pusher 24 is formed into an L-shape opening forward and placed on an upper surface of the caulking plate 15 in a freely sliding manner, and its rear end is connected to a rod portion of the hydraulic cylinder 27.

The caulking mechanism M2 will be explained hereunder. The caulking plate 15 is guided at both its left and right parts by sub-guides 42 so that it can move only in the longitudinal direction but can not rise upward, and a caulking claw 40 opening forward into an L-shape and protruding forward further than the caulking plate 15 is secured to an upper part of its front end. A rear end of the caulking plate 15 is notched into a half-circular shape in order to avoid an interference of it with a base portion of the support pin 38.

The insertion mechanism M1 will be explained hereunder. A pair of left and right push arms 13 extend in the longitudinal direction and are supported on support beds 45 installed vertically on the base 11 through horizontal fulcrum shafts 44 in such a manner as to be freely swingable in a vertical direction. Cam rollers 46 swingable around horizontal shafts are supported to the rear ends of the push arms 13, and in contact with the cam surfaces 35 of the cam members 18 so that these rollers are devised to be pushed up by forward movements of the cam members 18.

The swing arms 51 are supported to the front ends of the push arms 13 through horizontal support pins 50 respectively, both left and right sides of the pressure member 12 are supported through horizontal swing pins 53 to front ends of the swing arms 51 in a swingable manner. The swing pins 53 are naturally located forwardly of the support pins 50 and forward of the center of gravity of the pressure member 12, so that the pressure member 12 is inclined with its rear side lowered in a free state.

Figure 2:
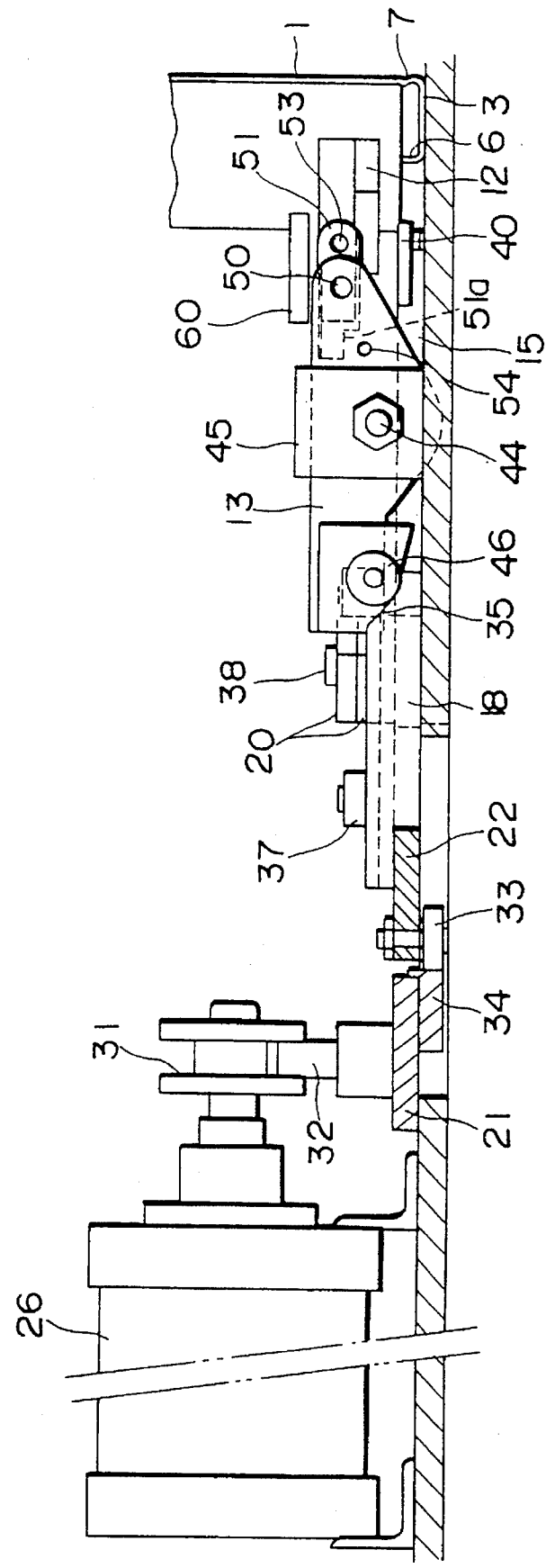
FIG. 2 is a sectional view taken on the line II—II of FIG. 1.

FIG. 2 shows the sectional view taken on the line II—II of FIG. 1. Hood members 60 for position restriction are installed at upper parts of the swing arms 51, which restrict the swing arms 51 from taking a nose-down position and restrict the pressure member 12 from taking a nose-up position in a before-operation condition shown by FIG. 2.

A key-like notch 51a is formed at a rear part of the swing arm 51, and this notch 51a forces a lower stopper pin 4 provided projectingly on the push arm 13 with a specified clearance left between them.

Figure 4:
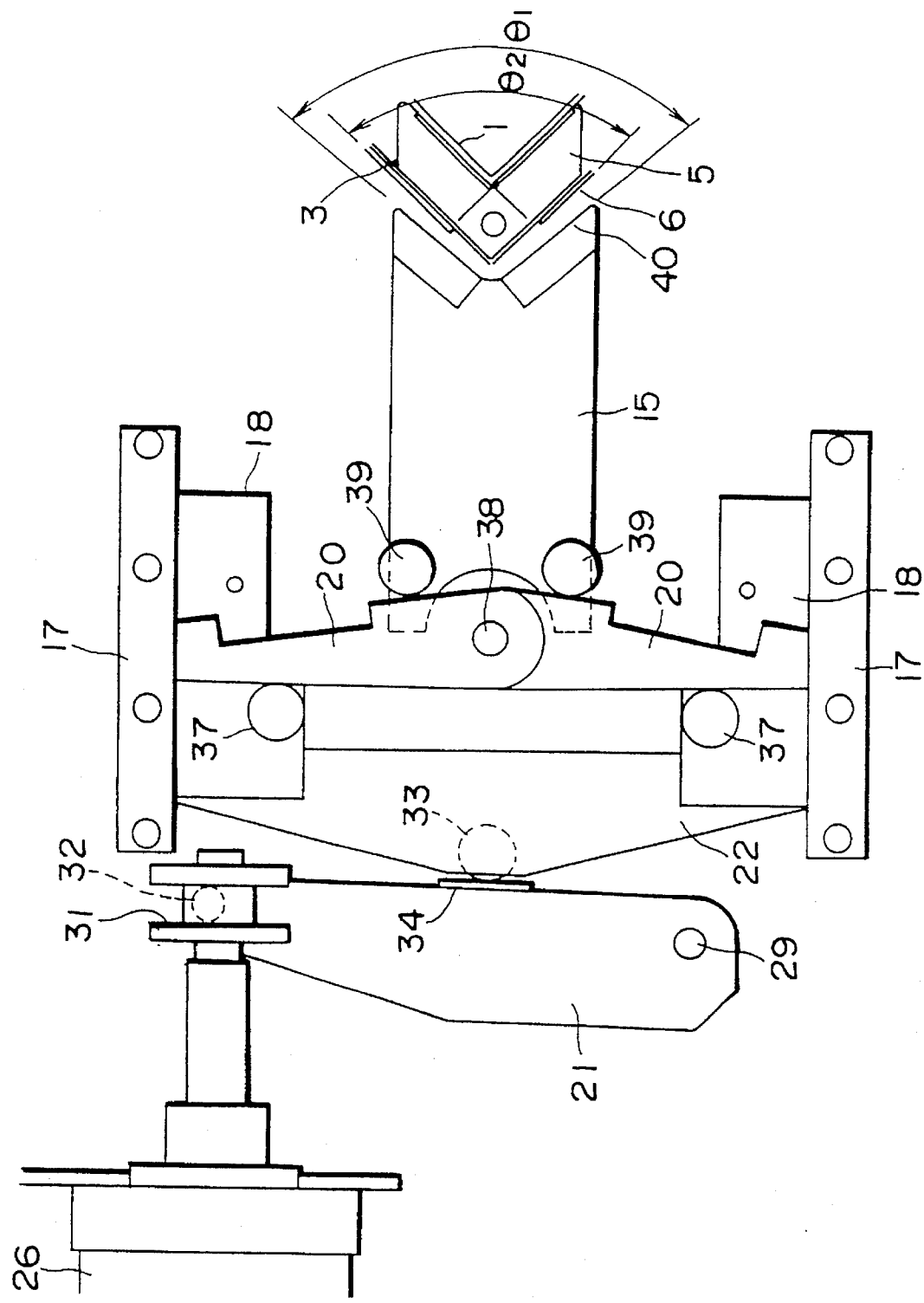
FIG. 4 is a schematic plan view showing the state at time of completion of insertion stroke.
Figure 5:
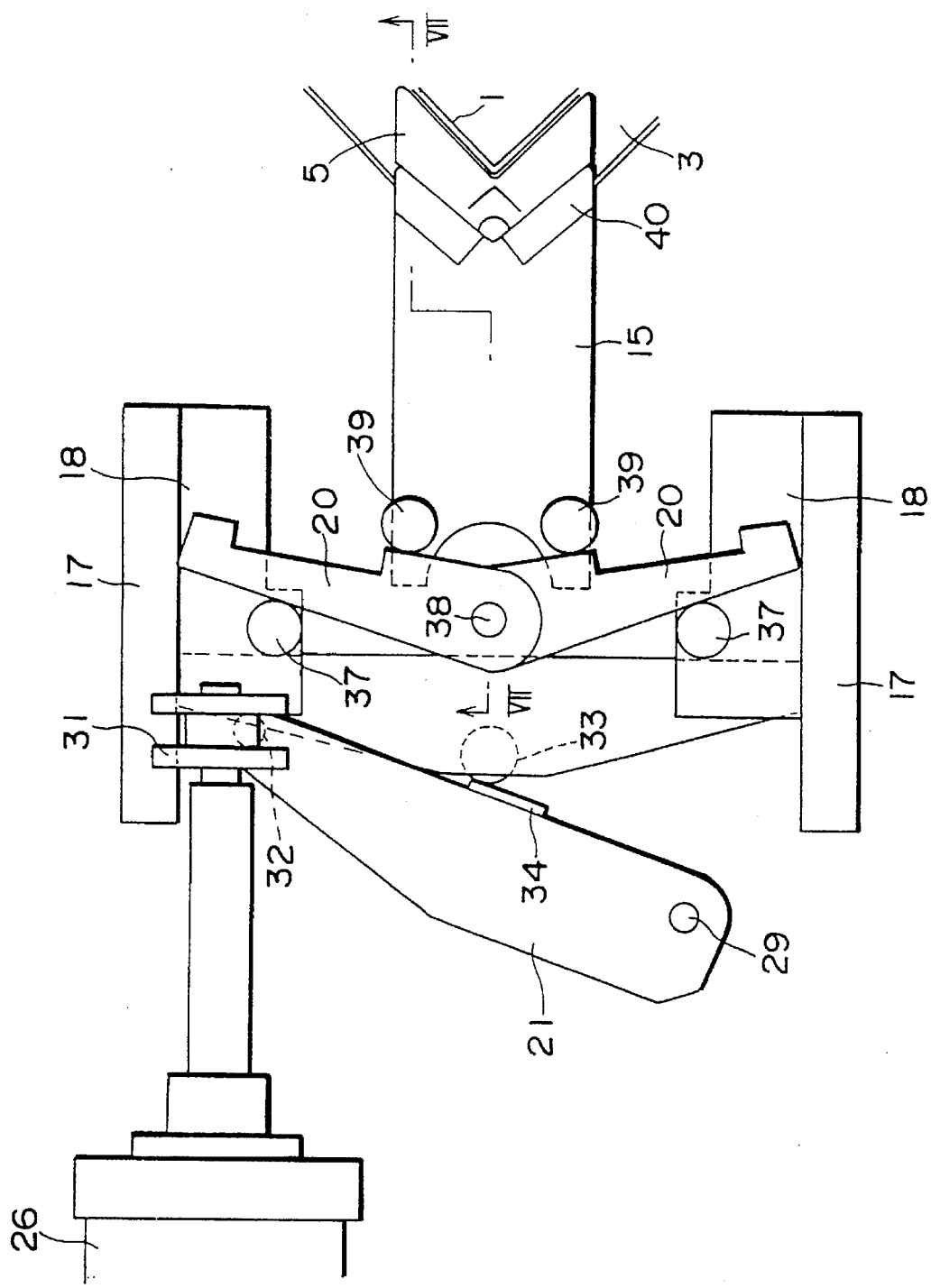
FIG. 5 is a schematic plan view showing the state at time of completion of caulking stroke.

In FIG. 4, an opening angle $\theta_1$ of the caulking claw 40 is made larger than an opening angle $\theta_2$ (i.e. right angle) of the flange 3 (bent portion 6) of the body duct 1 so that, as the caulking plate 15 advances, the claw comes in contact with the rear of the bent portion 6, i.e., its corner side, and gradually contacts both left and right sides.

(1) In FIG. 2 showing the before-operation state, the swing arm 51 is apt to swing to the nose-down position by the weight of the pressure member 12 with the support pin 50 as its fulcrum point, but this swing motion is restricted by contacting it with a rear edge of the hood member 60. The pressure member 12 is apt to incline to the nose-up position because its gravity point is located at a rear side of the swing pin 53, but this inclining motion is restricted by contacting it with a front edge of the hood member 60. Consequently, these members are kept at states near to approximately horizontal positions.

Figure 3:
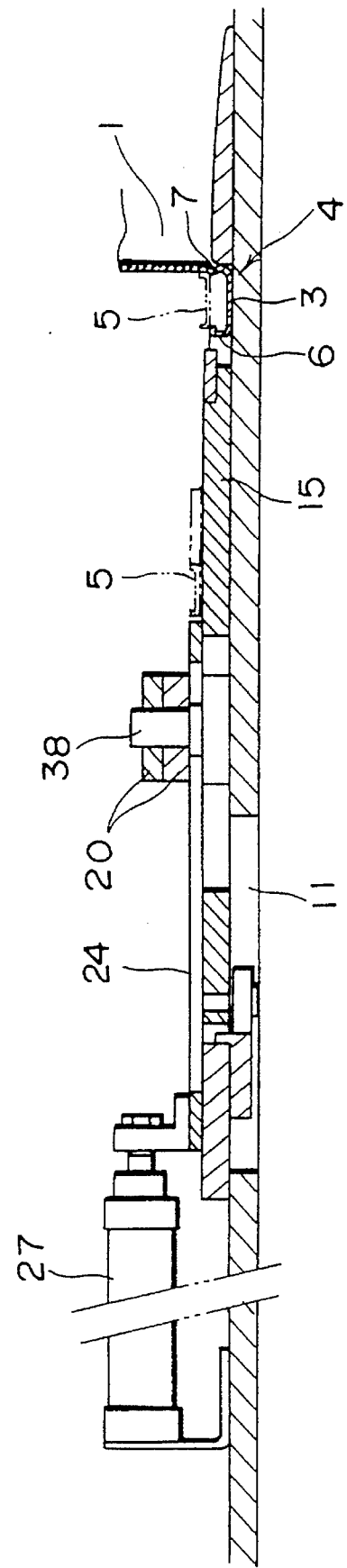
FIG. 3 is a sectional view taken on the line III—III of FIG. 1.

(2) In FIG. 3, the corner piece 5 has been fed onto the caulking plate 5. When the hydraulic cylinder 27 for the pusher is extended, the pusher 24 pushes the corner piece 5 forward and places it on a concave portion of the corner 4 of the duct body 1 i.e. on an upper end of the bent portion 6 and the convex streak 7.

(3) In the next stage, when the drive hydraulic cylinder 26 under the state of FIG. 1 is extended, the drive lever 21 is swung forward and the transmitting plate 22 is pushed forward through the central roller 33.

(4) When the transmitting plate 22 is advanced, the left and right cam members 18 are advanced integrally with it, rear ends of the push arms 13 are pushed up by the front cam surfaces 35 through the cam rollers 46 and push arms 13 are swung to the nose-down position around the fulcrum shaft 44.

(5) In the stroke wherein the front edges of the push arms 13 are lowered; when the pressure member 12 contacts with the corner piece 5, the front end support pins 50 of the push arms 13 move downward relative to the front end swing pins 53 of the swing arms 51, the rear ends of the swing arms 51 contact with the stopper pins 54, and the pressure member 12 is kept at the nose-up position because its gravity point is located at the rear side of the swing pins 53.

Figure 6A:
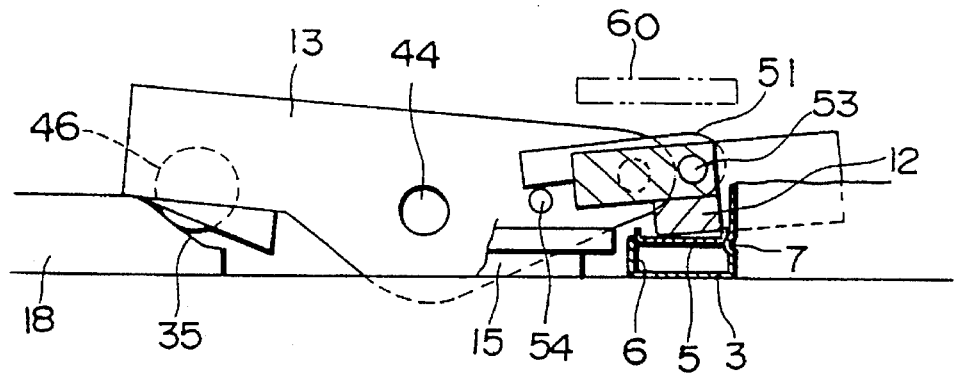
FIG. 6A, FIG. 6B and FIG. 6C are operational explanatory views showing, in operational sequence, an insertion mechanism roughly corresponding to a sectional view taken on a line VI—VI of FIG. 1.

(6) When the push arm 13 is swung from a state of FIG. 6A, the pressure member 13 moves downward while keeping the nose-up position to push the corner piece 5 downward. The corner piece 5 is pushed downward beyond the convex streak 7 down to a surface of the flange 3 as illustrated by FIG. 6B.

As mentioned above, since the corner piece 5 is pushed by the pressure member 12 in the nose-up position, the corner piece 5 is pushed forth from its rear end corner side gradually to both sides.

Figure 6B:
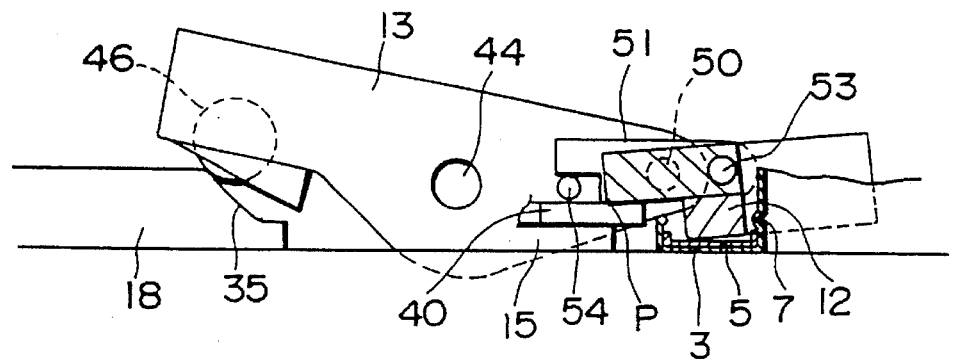

In FIG. 6B, when the corner piece 5 is pushed down to a surface of the flange 3, a rear bottom edge P of the pressure member 12 comes in contact with an upper surface of the caulking plate 15 or the caulking claw 40.

Figure 6C:
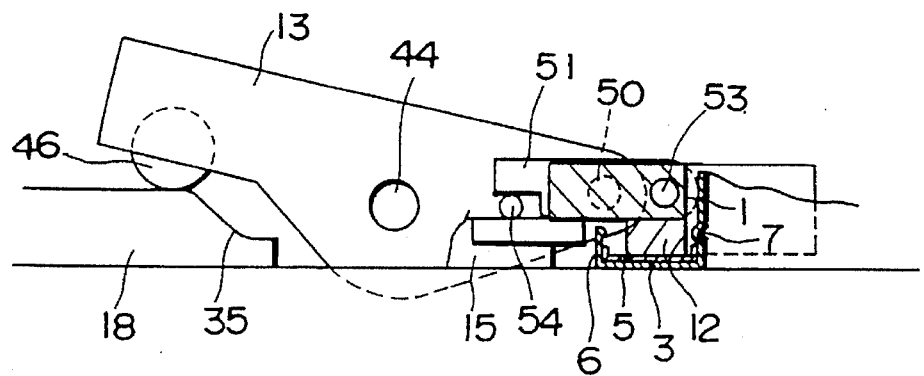
Figure 7:
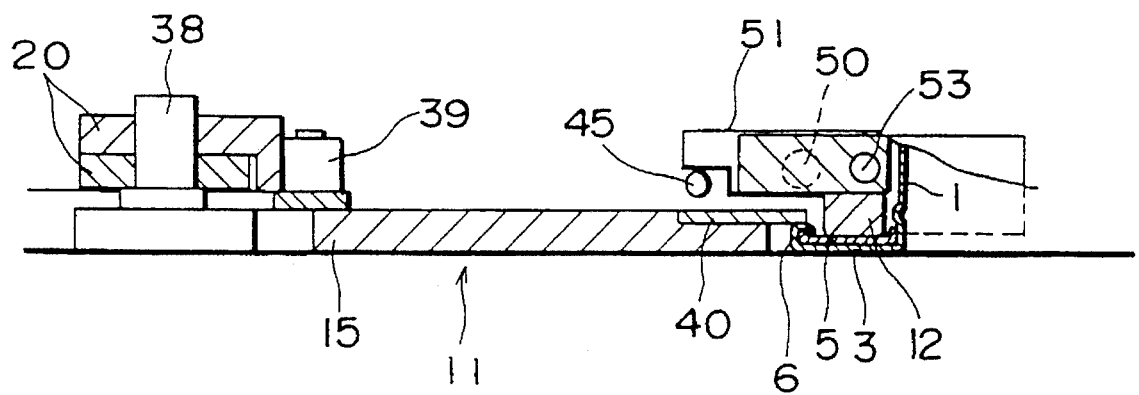
FIG. 7 is a sectional view roughly corresponding to a sectional view taken on a line VII—VII of FIG. 5.
Figure 8:
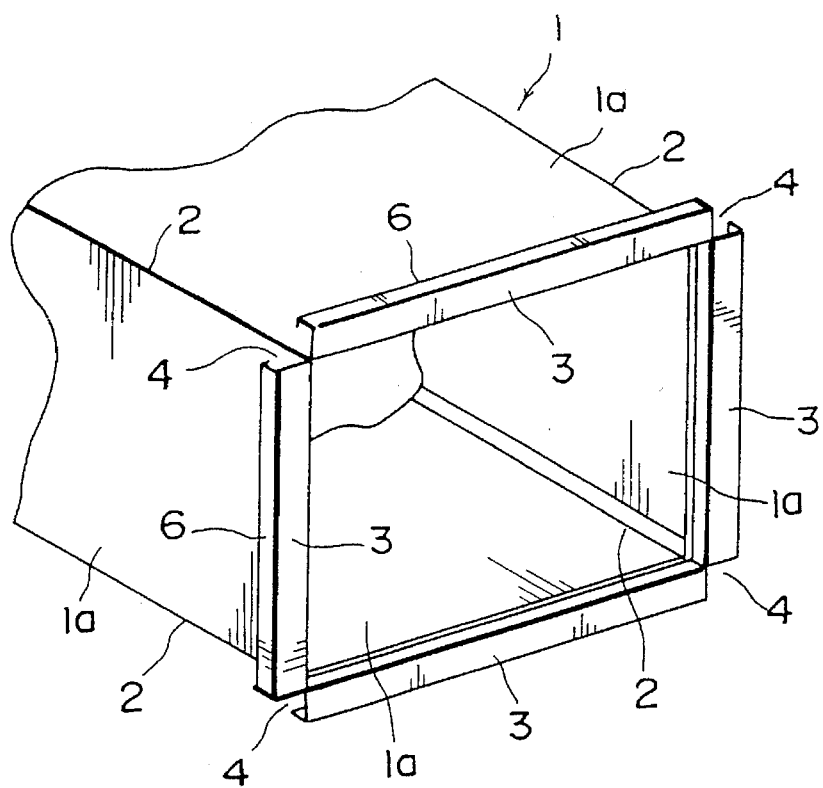
FIG. 8 is an oblique view of a half product of the duct.
Figure 9:
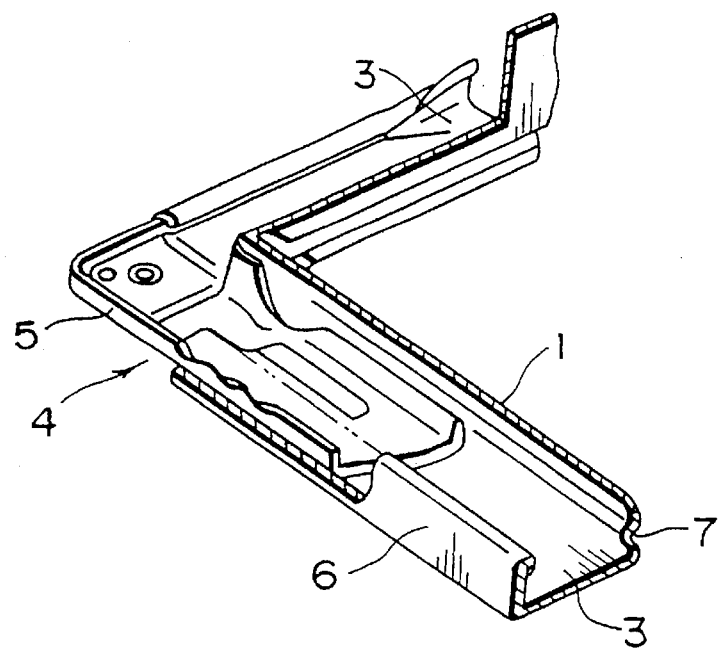
FIG. 9 is a partially sectional oblique view showing a state where the corner piece is inserted and fastened.

When the front end of the push arm 13 i.e. the support pin 50 moves downward further from the state of FIG. 6B, the pressure member 12 lowers at its both left and right front ends with the rear contact point P as its fulcrum point and changes finally to a horizontal position as illustrated by FIG. 6C.

Thereby, the corner piece 5 is positively pushed against the surface of the flange 3.

The above-mentioned insertion stroke is carried out by the movement of the transmitting plate 22 corresponding to the stroke L1 of FIG. 1. After completion of this stroke, the cam roller 46 comes to a state of climbing up a topmost surface of the cam member 18 as illustrated by FIG. 6C, and the transmitting plate 22 comes approximately in contact with the swing lever 20 as illustrated by FIG. 4.

When the transmitting plate 22 further advances from the state of FIG. 4, the stroke changes to a caulking stroke. Namely, the both swing levers 20 are swung forward by the both left and right rollers 37 of the cam member 18 and the caulking plate 15 is made advanced through the rollers 39. Then, the upper ends of the bent portions 6 of the flanges 3 are caulked by the front end caulking claw 40 so that the corner piece 5 is fastened.

In this caulking stroke, since the opening angle θ2 of the caulking claw 40 is made larger then the right angle, the caulking work is carried out from the corner side (rear side) of FIG. 4 and then gradually to the both left and right front end sides.

After completion of the insertion/caulking work; the transmitting plate 22, the cam member 18, the swing lever 20 and the caulking plate 15 are returned to their original states through the return hook 57, the return link 58 and the return pin 59 etc. of FIG. 1 by retracting motion of the hydraulic cylinder 26. The push arm 13 is returned to its original state by a return spring 61.

We claim:

1. A corner piece insertion mechanism for inserting an L-shaped corner piece into corner portions of concave outward flanges formed on open edges of a duct having a rectangular cross section comprising:

a pair of vertically swingable push arms parallel to each other, the push arms having a forward end and a rearward end;

a vertically swingable swing arm having a forward end supported at the forward end of each of the push arms through support pins;

a vertically swingable pressure member for contacting with and pushing down the corner piece supported at the forward end of each of the swing arms through swing pins;

a stopper pin on each of the push arms for restricting the swing arms from rising at their forward ends beyond a specified angle relative to the push arms; and the rearward ends of the push arms being connected to and interlocked with a drive actuator through a drive force transmission mechanism for driving the push arms in a vertical direction.

2. A caulking mechanism for caulking upper ends of bent portions of flanges in order to fasten an L-shaped corner piece inserted into corner portions of concave outward flanges formed on open edges of a duct having a rectangular cross section comprising:

a caulking plate movable forward and backward in a horizontal direction relative to the duct;

a caulking claw which opens toward the duct into an L-shaped form and can contact with upper ends of bent portions of flanges of the duct integrally mounted at one end of the caulking plate;

the l-shaped opening having an angle which is larger than 90°; and the other end of the caulking plate being connected to and interlocked with a drive actuator through a drive force transmitting mechanism.

3. A corner piece insertion/caulking mechanism for inserting an L-shaped corner piece into corner portions of concave outward flanges formed on open edges of a duct having a rectangular cross section and for caulking upper ends of bent portions of the flanges comprising:

vertically swingable push arms having a pressure member at one end thereof for serving as an insertion mechanism;

a caulking plate having an L-shaped caulking claw at one end thereof and movable forward and backward relative to the duct for serving as a caulking mechanism;

an actuator which extends in a first stage and a second stage and retracts for serving as a drive actuator;

a drive force transmitting mechanism having a cam mechanism for swinging the push arms of the insertion mechanism when the actuator extends in said first stage; and a mechanism for advancing the caulking plate when the actuator extends in said second stage.

* * * * *